United States Patent [19]

Dubech

[11] Patent Number: 4,919,581
[45] Date of Patent: Apr. 24, 1990

[54] LOSS-PROOF FASTENER AND CONSTITUENT PART

[75] Inventor: Gérard Dubech, Toulouse, France

[73] Assignee: MECAERO, S.A., Muret, France

[21] Appl. No.: 889,837

[22] Filed: Jul. 28, 1986

Related U.S. Application Data

[63] Continuation of Ser. No. 724,247, Apr. 17, 1985, abandoned.

[30] Foreign Application Priority Data

Apr. 25, 1984 [FR] France .................................. 84 06904

[51] Int. Cl.$^5$ ............................................. F16B 21/18
[52] U.S. Cl. .................................... 411/353; 411/347; 411/517
[58] Field of Search ............... 411/352, 353, 517, 518, 411/519, 520, 521, 528, 347, 479

[56] References Cited

U.S. PATENT DOCUMENTS

| | | | |
|---|---|---|---|
| 3,503,431 | 3/1970 | Villo et al. | 411/353 |
| 3,508,775 | 4/1970 | Simonsen | 411/347 X |
| 3,752,515 | 8/1973 | Oaks et al. | 411/517 X |
| 3,838,928 | 10/1974 | Blaurock | 411/517 X |
| 4,287,807 | 9/1981 | Pacharis et al. | 411/517 X |

FOREIGN PATENT DOCUMENTS

| | | | |
|---|---|---|---|
| 853227 | 10/1952 | Fed. Rep. of Germany | 411/517 |
| 1047719 | 7/1953 | France | 411/517 |

Primary Examiner—Rodney M. Lindsey
Attorney, Agent, or Firm—Harold H. Dutton, Jr.

[57] ABSTRACT

A loss-proof fastener of the type comprising a fastener member including a shank portion having an annular groove (2) and a ring (3) in the groove and transversely split (7) so as to provide an elastic deformation in the direction of the circumference, whereby in a rest condition the ring projects beyond the shank portion surface and in a compressed condition is retracted within the groove, the ring having a cross-section such that the ring is elastically deformable so as to be capable of transverse elongation and radial contraction when the ring is compressed, and the ring when positioned in the groove having a lateral play to permit the cross-section thereof to freely deform when compressed between the rest and the compressed conditions.

15 Claims, 4 Drawing Sheets

LOSS-PROOF FASTENER AND CONSTITUENT PART

CROSS REFERENCE TO RELATED APPLICATION

This application is a continuation of U.S. application Ser. No. 724,247, filed Apr. 17, 1985 now abandoned.

This invention relates to a loss-proof fastener comprising retention means for preventing accidental disengagement of the fastener from the assembly hole. The invention also relates to a ring forming one of the constituents of the fastener.

The present invention applies to fasteners of the bolt, screw, spindle, etc. type having a member provided with a generally cylindrical shank. More particularly the invention relates to fasteners of which this member is provided with a thread at one end to put in place a nut or a system of nuts, however the invention may also relate to such fastener members which do not have threads.

BACKGROUND AND OBJECTS

In some technical fields, and in particular in aeronautics, safety means must be provided on bolts to prevent the bolt from disengaging from the assembly hole in the event the system of nuts should accidentally become loose, for example due to vibration.

For example, French patent No. 1 506 796 describes a bolt provided at the base of its thread with a groove into which is inserted a cylindrical-base ring which is transversely slotted so that it can elastically deform in the circumferential direction. (Hereafter the expression "transverse" refers to the ring and not to the member supporting it.)

FIG. 1 of the attached drawings illustrates one of the fasteners of this type, which presently is most widely used in aeronautics. FIG. 2 is a cross-sectional detail of this known type of fastener. The ring has a solid cross-section and a cylindrical base and is arranged in the bolt groove so as to project in the rest position from the shank and when in the compressed state, is retracted inside the groove. Such a ring makes it possible to place the bolt in the assembly hole by exerting a penetrating force on the bolt so that, by a radial compression in the hole, the ring will be retracted within the groove. Once the ring has passed through the hole, it returns to rest due to its circumferential elasticity and assures that the bolt shall be kept in the hole.

The ring is shown illustratively in FIGS. 1 and 2 in solid lines in the rest position where it is assumed to be resting on the bottom of the groove by the upper generatrix gs of its cylindrical base (its opposite lower generatrix gi therefore being that which is the farthest from the bottom). The ring in the compressed state is shown in dashed lines in FIG. 2.

To permit complete retraction of the ring within its groove, it is easily seen that the distance "a" separating the generatrix gi from the groove bottom must exceed the height "b" of the ring cross-section. For a given ring, this distance "a" therefore cannot be arbitrarily reduced by the manufacturer.

Under these conditions, it is impossible to reconcile two technical imperatives desired by the aeronautics designers:

on one hand, to achieve as small as possible a groove depth "c" in order not to degrade the bolt strength at that level, this strength being proportional to the square of the diameter of the solid part, on the other hand to eliminate the danger of tearing off the ring when being inserted into the hole or being removed from it, demanding thereby that the ring side edges dl be housed within the groove over its entire periphery so that said edges shall not hit and hook into the hole edges during this insertion or removal.

As shown in FIG. 2, meeting the former condition implies a shallow groove of depth "c", less than or about the size of "a", whereby the edges dl project from the ring at some part of its periphery, while the latter condition is not met. If on the contrary, the latter condition is met, the bolt groove is deeper in the same bolt, with depth c' shown in dashed lines in FIG. 2, whereby the mechanical strength is degraded at the gorge with respect to the strength of the other shank parts.

The former condition is mandatory for the strength of the assembly, but especially in the case of threaded bolts, breaks appear most frequently near the hole orifice at the base of the thread. That is precisely where the groove is located and any strength reduction at that point degrades in the extreme the strength of the assembly.

The latter condition is important because the danger of tearing off the ring in the first place entails losses in time when the bolt is inserted and furthermore a drop in reliability since a more than trivial percentage of bolts will be without rings following several cycles of use, and this defect may be overlooked in some cases.

Furthermore, it has been noted that the retaining force generated by these known rings strongly decreases with the number of insertions and removals. Thus, a ring of the type shown in FIGS. 1 and 2 generating a retaining force of about 8 kg-f when first used only produces a force of about 2.5 kg-f after 100 tests. This drift represents a serious defect in practice in aeronautics because leading to uncertainty about the actual effectiveness of the emplaced rings.

Moreover, the force of insertion required to put these rings in place for the first uses (about 8 kg-f) as a rule is considered excessive by the aeronautics designers and a force of about 3 to 4 kg-f appears a better compromise, allowing both good retention and satisfactory installation conditions.

Therefore, the primary object of the present invention is to remedy the above drawbacks of the known fasteners.

In particular, one object of the invention is to eliminate the danger of tearing off the ring during the insertion and removal operations without thereby having to deepen the groove housing said ring.

Another object of the invention is to substantially reduce the variations in the retaining force and/or the penetration force during the sequential operations of use.

Another object is to create a fastener which can be adjusted so that the insertion force shall be less than for the known fasteners and in particular approximately between 2 and 4 kg-f.

Another object of the invention is to make possible a significant gain in weight, which is particularly desirable in aeronautics.

DESCRIPTION OF THE INVENTION

To that end, the loss-proof fastener of the invention is of the type which on one hand includes a member provided with a shank with an annular groove and on the other hand includes a transversely split ring in order that this ring may elastically transform in the circumferential direction, this ring being housed in the said groove in such a manner that when at rest, it projects from the shank surface and when compressed it is retracted within the groove; in the present invention, the fastener is characterized in that:

the ring is provided with a cross-section permitting elastic deformation so it can undergo transverse extension and radial contraction when compressed, and the ring is housed in the groove with a lateral play adequate so its cross-section can freely deform when the ring is compressed between its rest position and its compressed state.

In particular, the ring may have a channel cross-section in that part of it which is located opposite the groove bottom whereby the material thickness of the ring is less than the height of its cross-section.

In a preferred embodiment, the ring comprises a thickness of material which is nearly very constant over most of its cross-section which includes a center part extended on either side by flanks sloping toward the groove bottom.

Thus, the fastener of the invention is provided with a ring evincing dual elasticity:

on one hand, as in the known fasteners, an overall circumferential assembly elasticity made possible by its slit, on the other hand an elasticity due to its cross-section which is deformable and can undergo transverse elongation and radial contraction when compressed.

As will be further described below, this dual elasticity allows combining the following results and advantages: the elimination of the danger of the ring being torn off while still having the latitude to reduce the groove depth, the retaining force undergoing only slight changes as the ring is repeatedly inserted, a lower required insertion force, and reduction in ring weight in the preferred case of channel cross-section.

In particular, the invention applies to members provided with a thread at the end of their shank to emplace a nut or system of nuts. The annular grove is located near the base of this thread which, where appropriate, may include a diametrical bore at its end to seat a pin assuring additional safety.

DESCRIPTION OF THE DRAWINGS

Other features and advantages of the invention will become clear when considered in relation to the accompanying description with reference to the attached drawings showing preferred embodiments and variations, and in which.

As used herein, the terms "transverse" or "cross-section" refer to the ring, i.e. to a section through a plane containing the axis of the ring.

DESCRIPTION OF THE PREFERRED EMBODIMENTS

Figure 3:
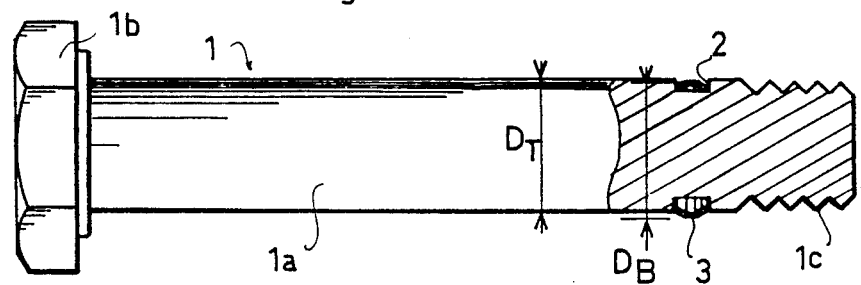
FIG. 3 is a partial sectional view of a fastener according to the invention.
Figure 4:
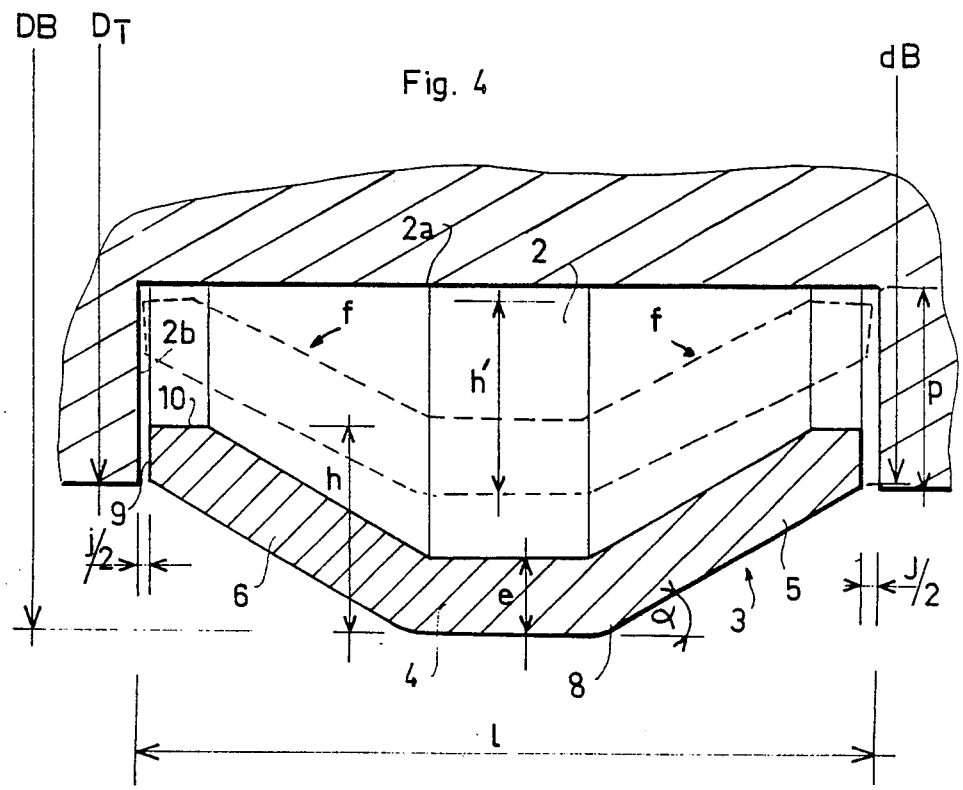
FIG. 4 is an enlarged cross-sectional detail view of a portion of the fastener of FIG. 3.

The fastener of the present invention, as shown illustratively in FIGS. 3 and 4 comprises a bolt 1 comprising a cylindrical shank 1a, a head 1b, and at the opposite end a thread 1c which, where appropriate, may include a transverse bore to install a cotter pin or the like.

At the base of the thread 1c, the bolt comprises an annular groove 2 of rectangular cross-section and a cylindrical bottom 2a bounded by plane sides 2b. This groove may be made as by cutting.

Figure 5:
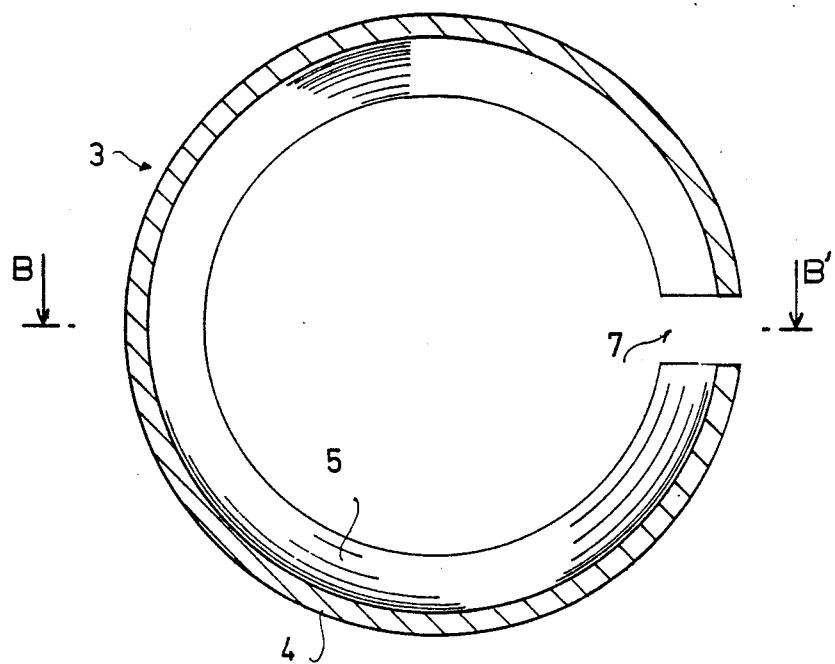
FIG. 5 is a cross-sectional view of a ring according to the invention and taken along lines 5—5 of FIG. 6 and viewed in the direction of the arrows.
Figure 6:
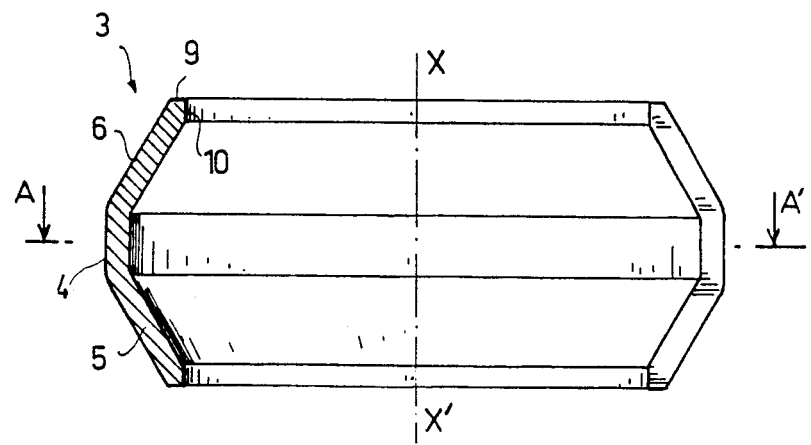
FIG. 6 is a transverse cross-sectional view of a ring according to the invention and taken along lines 6—6 of FIG. 5 and viewed in the direction of the arrows.

The groove 2 is provided with a ring 3 shown in FIG. 5 in axial section through a plane perpendicular to the bolt axis and in FIG. 6 in cross-section through a plane orthogonal to the preceding plane.

The ring 3 has a thickness e which is essentially constant and is made of a material with a suitable elasticity, for instance stainless steel "Z6 CuN 17.04". Where appropriate, the ring may be made of other materials, e.g. plastics, elastomers, etc.

This ring includes a center part 4 which is cylindrical in shape and which extends parallel to its axis XX' and two identical flanks 5 and 6 sloping toward this axis and frustoconical in shape. Therefore, its cross-section as illustrated in FIG. 4 presents a channel part or shape opposite the bottom 2a of the groove 2, with the height of the cross-section being much larger than the thickness e of the material.

This shape imparts the ring's cross-section with elastic deformability in the direction of the arrows f of FIG. 4, so that when centripetally compressed, the section can elongate transversely, in a direction parallel to XX', and can contract radially, thereby reducing the height h of the section to a lesser value h'.

Moreover, the ring 3 is provided at a zone on its periphery with a transverse slit 7, providing the ring with elastic deformability in the circumferential direction.

More particularly, the two flanks 5 and 6 of the ring slope with respect to the center part by an angle alpha approximately between 20° and 40°, in particular about 30°. Each flank joins the center part at the outside of the ring by a rounded transition such as 8.

Each of the flanks 5 and 6 has an end edge with a lateral front surface 9 which is planar, and with an inside cylindrical surface 10. When the ring is in the rest condition, i.e. uncompressed, its front sides 9 are located in places orthogonal to the axis XX' and the cylindrical sides 10 are centered on this axis.

The ring 3 and the groove 2 are mutually so dimensioned that in the rest condition of the ring, the end edges of the flanks 5 and 6, and in particular their plane sides 9, are located entirely within the groove over the entire ring periphery (the diameter $d_B$ at the end edges being less than or equal to the diameter $D_T$ of the bolt shank), the center part 4 projects from said groove over at least one sector of its periphery (the outside diameter $D_B$ of the center part of the ring is larger than the diameter $D_T$ of the bolt shank), the ring is located in the groove with a lateral play j suitable to allow its cross-section to freely deform when compressed.

Furthermore, the depth of the groove is chosen in such a manner that the ring can refract wholly within the groove when a compression is applied to the ring. As a result of this stress, the dual elasticity of the ring is implemented, on one hand as its diametrical contraction (circumferential elasticity), and on the other hand as a radial contraction in its cross-section (intrinsic elasticity of the cross-section).

Figure 1:
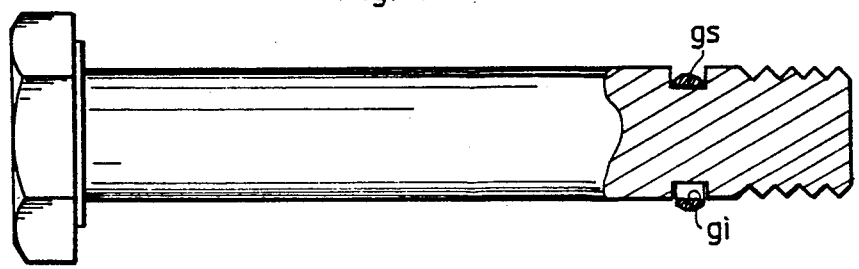
FIG. 1 is a partial sectional view of a prior art fastener.
Figure 2:
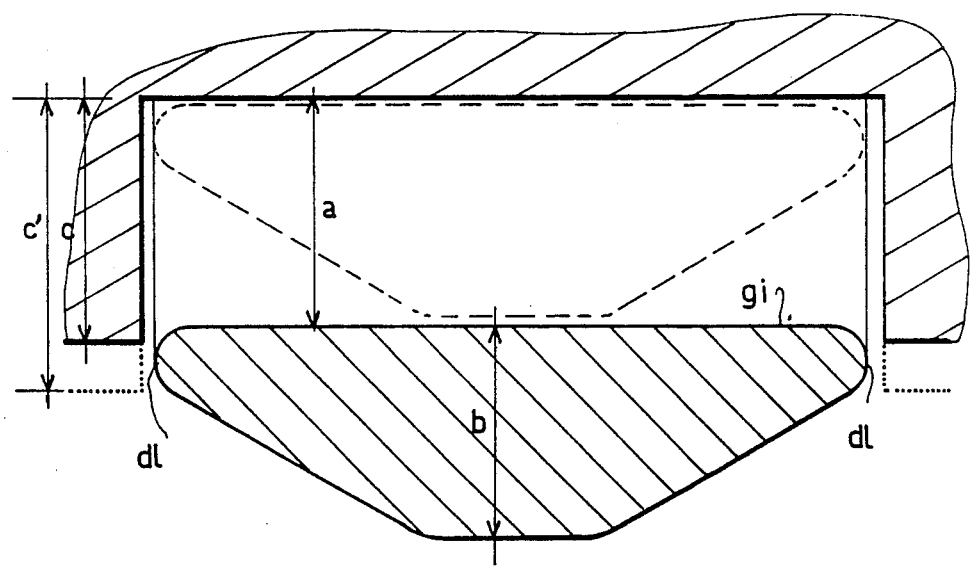
FIG. 2 is an enlarged cross-sectional detail view of a portion of prior art fastener of FIG. 1.

Under these conditions, the required minimum depth of the groove is substantially lessened with respect to those demanded in the conventional rings illustrated in FIGS. 1 and 2, and this is the case in spite of a rest condition total insertion of the end edges 9 and 10 inside the groove 2. This is so because the dual elasticity of the ring makes possible a radial contraction which is more substantial at the center part 4 than at the flanks 5 and 6.

The ring 3 can be manufactured by any known method: cut from a blank, rolled from an extruded shape, etc. It is installed in the groove due to an expansion made possible by its elasticity.

The dimensional parameters of the shown fastener are indicated below in illustrative, but non-restrictive, manner in order to provide an idea of their sizes.

The shanks of the bolts presently used in aeronautics have diameters $D_T$ between about 4 and 20 mm; the groove may have a width 1 between about 2 and 4 mm and a depth p between about 0.3 and 1.5 mm.

In the rest condition, the height h of the cross-section of each ring may be between about 0.3 and 1.5 mm; the width of the ring is so selected that the total lateral play j between the ring and the groove shall be roughly between 0.1 and 0.3 mm. The thickness e of the ring may be between 0.15 and 0.4 mm.

Figure 7:
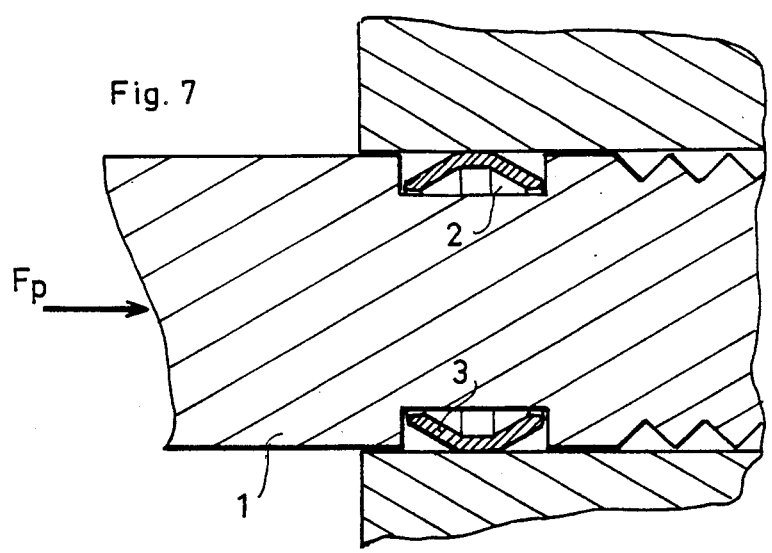
FIG. 7 is a schematic view showing the fastener being installed.

FIG. 7 illustrates the insertion of the fastener into an assembly hole. It has been found that the force of penetration Fp required to compress a ring of the above mentioned type from its rest condition into a compressed state wherein it is retracted within the groove 2 is approximately 3 to 4 kg-f. Consecutive tests performed on rings of this type evinced a penetration force of 3.8 kg-f during the first penetration and of 3.4 kg-f during the hundredth. Accordingly, the force of penetration is less than for the conventional fasteners and can be easily adjusted within the desired range in aeronautical technology. Furthermore, this force, and the retention force equal to it, undergo only slight variations in the course of consecutive uses.

Figure 8:
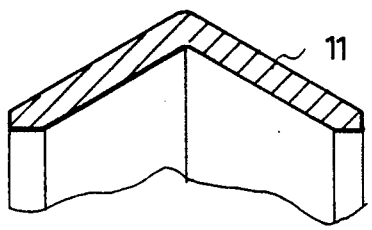
FIGS. 8, 9 and 10 are fragmentary cross-sectional views showing variations of the invention.
Figure 9:
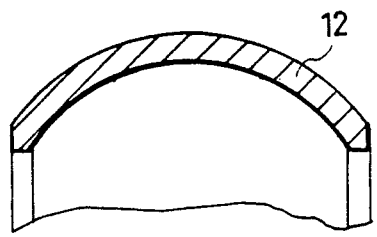
Figure 10:
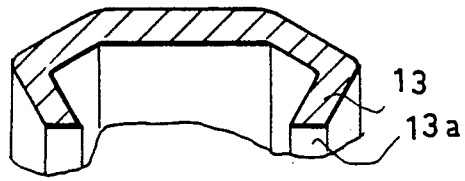

FIGS. 8, 9 and 10 are partial cross-sections of shape variations of rings with channel-like cross-sections. All these rings are split transversely and are located in the bolt groove in a manner similar to that described above.

The ring of FIG. 8 comprises two frustoconical flanks such as 11 which slope toward the ring axis. These two flanks join one another by a rounded transition at the outside.

The ring shown in FIG. 9 has a section 12 in the form of a crown sector. This crown can be bounded by circles or other curves.

The ring shown in FIG. 10 is similar to those of FIGS. 2-3, but includes two additional legs such as 13 joined to the ends of the flanks. These legs form an elastic bend toward the inside and their end edges 13a are cylindrical.

While this invention has been described as having certain preferred features and embodiments, it will be understood that it is capable of still further modification and variation within the spirit of the invention, and this application is intended to cover all variations, modifications and adaptations of the invention as fall within the spirit of the invention and the scope of the appended claims.

I claim:

1. A loss-proof fastener of the type capable of repeated insertion through and withdrawal from a passageway formed in a workpiece without significant damage to the fastener and comprising a fastener member including a shank portion having an annular groove (2) and a ring (3) in said groove and transversely split (7) so as to provide an elastic deformation in the direction of the circumference, said ring having a cross-section such that said ring is elastically deformable so as to be capable of transverse elongation and radial contraction when said ring is subjected to a radial compressive force, and said ring having lateral edges lying within said groove around the circumference of said ring both in a rest condition and in a compressed condition and a portion between said radial edges extending radially beyond said shank portion in said rest condition whereby in a rest condition said portion of said ring projects beyond the shank portion surface and in a compressed condition is retracted within said groove, and said ring when positioned in said groove having a lateral play to permit the cross-section thereof to freely deform when compressed between the rest and the compressed conditions.

2. A fastener as in claim 1 and wherein said ring has a channel-shaped cross-section in that portion opposite the bottom of said groove, whereby the thickness (e) of the ring material is less that the height (h) of the cross-section.

3. A fastener as in claim 2 and wherein said ring comprises center part (4) and flank portions (5, 6) on either side of said center part sloping toward the bottom of said groove (2a) and having a material thickness e substantially constant over most of the cross-section of said ring.

4. A fastener as in claim 3 and wherein said ring (3) is positioned in said groove in such a manner that in the rest condition said flank portions have end edges located within said groove over its entire periphery, the center portion (4) projecting from said groove over at least a sector of the periphery.

5. A fastener as in claim 4 and wherein said groove (2) has an essentially rectangular cross-section having plane sides (2b), each plane end edge of said ring comprising laterally a plane front side (9) located opposite the corresponding plane opposite the side (2b) of said groove, and on the inside a cylindrical side (10) opposite the groove bottom (2a).

6. A fastener as in claim 3 and wherein said ring includes a cylindrical center portion (4) which in the rest condition has a diameter ($D_B$) larger than the diameter ($D_T$) of said shank portion (1a), and two flank portions (5, 6) extending from said center portion and being of the same thickness as said center portion, each of said flank portions comprising a frustoconical shape of a diameter ($d_B$) at the end edges which is less than or equal to the diameter ($D_T$) of said shank portion.

7. A fastener as in claim 6 and wherein said flank portions of said ring slope with respect to said center portion at an angle of approximately 20° and 40°.

8. A fastener as in claim 6 and wherein each of said flank portions is joined to said center portion at the outside ring surface by a rounded transition (8).

9. A fastener as in claim 6 and wherein said shank portion (1a) has a diameter ($D_T$) of between about 4 and 20 mm and wherein said groove has a width (1) between about 2 and 4 mm and a depth (p) between about 0.3 and 1.5 mm, and wherein is the rest condition, the height (h) of the cross-section of the ring (3) is between about 0.3 and 1.5 mm, and the lateral play (j) between the ring and the groove is between about 0.1 mm and 0.3 mm.

10. A fastener as in claim 3 and wherein said ring (3) is made of steel and has a thickness (e) of between about 0.15 and 0.4 mm.

11. A fastener as in claim 6 and wherein said ring (3) is made of steel and has a thickness (e) of between about 0.15 and 0.4 mm.

12. A fastener as in claim 1 and wherein said shank portion is provided with a thread (10) at the end thereof, said groove being located near the base of said thread.

13. A fastener as in claim 1 and wherein said ring has a cross-section including a cylindrical center portion (4) which in the rest condition has a diameter ($D_B$) larger than the diameter ($D_T$) of said shank portion (1a), and two flank portions (5, 6) extending from said center portion and being of the same thickness as said center portion, each of said flank portions comprising a frusto-conical shape of a diameter ($d_B$) at the end edges which is less than or equal to the diameter ($D_T$) of said shank portion.

14. A fastener as in claim 1 and wherein said ring is continuous around its circumference with the exception of the transverse split.

15. A loss-proof fastener for insertion through a passageway in a stack of workpieces to be secured and being of the type capable of repeated insertion through and withdrawal from the passageway formed in the workpieces without significant damage to the fastener and comprising a fastener member including a shank portion having a longitudinal axis, an annular groove (2) formed in said shank portion and a retaining ring (3) positioned in said groove, said retaining ring being longitudinally split and elastically deformable so as to be capable of substantially simultaneous transverse elastic elongation and radial elastic contraction when said ring is compressed by a radial compressive force generated upon insertion into or removal from the passageway and said retaining ring having a cross-sectional configuration comprising two flank portions and a central portion connecting said flank portions, said central portion being such as to lie radially outside said groove when said ring is relaxed and to lie radially within said groove when said ring is radially compressed, and said flank portions having ends lying within said groove both when said ring is relaxed and when said ring is radially compressed and said flank portion ends being capable of elastically moving apart in a direction substantially parallel to said longitudinal axis when said ring is radially compressed, and said groove being of an axial length slightly greater than the distance between said flank ends so as to permit said flank ends to move apart.

* * * * *